(12) United States Patent
Garg et al.

(10) Patent No.: US 8,180,644 B2
(45) Date of Patent: May 15, 2012

(54) METHOD AND APPARATUS FOR SCROLLING TEXT DISPLAY OF VOICE CALL OR MESSAGE DURING VIDEO DISPLAY SESSION

(75) Inventors: Dinesh Kumar Garg, Roorkee (IN); Manish Poddar, Burhanpur (IN)

(73) Assignee: QUALCOMM Incorporated, San Diego, CA (US)

( * ) Notice: Subject to any disclaimer, the term of this patent is extended or adjusted under 35 U.S.C. 154(b) by 910 days.

(21) Appl. No.: 12/211,973

(22) Filed: Sep. 17, 2008

(65) Prior Publication Data
US 2010/0057466 A1  Mar. 4, 2010

(51) Int. Cl.
G10L 11/00 (2006.01)
G10L 15/26 (2006.01)
H04N 7/14 (2006.01)
H04N 11/00 (2006.01)
H04N 7/173 (2006.01)
H04N 7/16 (2011.01)
G06F 3/00 (2006.01)
G06F 3/048 (2006.01)

(52) U.S. Cl. ............ 704/270; 704/235; 348/14.04; 348/552; 715/716; 715/785; 725/37; 725/131; 725/139

(58) Field of Classification Search .................. None
See application file for complete search history.

(56) References Cited

U.S. PATENT DOCUMENTS

| 5,920,835 A | 7/1999 | Huzenlaub et al. |
| 5,953,392 A | 9/1999 | Rhie et al. |
| 5,956,681 A | 9/1999 | Yamakita |
| 6,173,259 B1 | 1/2001 | Bijl et al. |
| 6,459,906 B1 | 10/2002 | Yang |
| 6,763,095 B1 * | 7/2004 | Cermak et al. ............ 379/93.23 |
| 7,000,018 B1 | 2/2006 | Begis |
| 7,561,677 B2 * | 7/2009 | Flynt et al. ................. 379/88.14 |

(Continued)

FOREIGN PATENT DOCUMENTS

EP  1650937 A1  4/2006

(Continued)

OTHER PUBLICATIONS

Get Your Voicemail As Text, Presented by Line1 Communications, available at www.viewyourvoicemail.com (last visited Mar. 28, 2008).

(Continued)

Primary Examiner — Brian Albertalli
(74) Attorney, Agent, or Firm — Elaine Lo (57) ABSTRACT

A method and communication device disclosed includes displaying a video on a display, converting voice audio data to textual data by applying voice-to-text conversion, and displaying the textual data as scrolling text displayed along with the video on the display and either above, below or across the video. The method may further include receiving a voice call indication from a network, providing the voice call indication to a user interface where the voice call indication corresponds to an incoming voice call; and receiving a user input for receiving the voice call and displaying the voice call as scrolling text. In another embodiment, a method includes displaying application related data on a display; converting voice audio data to textual data by applying voice-to-text conversion; converting the textual data to a video format; and displaying the textual data as scrolling text over the application related data on said display.

12 Claims, 11 Drawing Sheets

U.S. PATENT DOCUMENTS

| | | | | |
|---|---|---|---|---|
| 7,565,680 B1* | 7/2009 | Asmussen | ..................... | 725/135 |
| 7,627,349 B2* | 12/2009 | Vetelainen et al. | ........... | 455/566 |
| 7,814,522 B2* | 10/2010 | Asmussen | ..................... | 725/102 |
| 7,917,178 B2* | 3/2011 | Watson | ......................... | 455/563 |
| 8,019,271 B1* | 9/2011 | Izdepski | ...................... | 455/3.01 |
| 2003/0043260 A1* | 3/2003 | Yap et al. | ................... | 348/14.06 |
| 2007/0039036 A1* | 2/2007 | Sullivan et al. | ............... | 725/133 |
| 2007/0115389 A1* | 5/2007 | McCarthy et al. | ............ | 348/461 |
| 2008/0120285 A1* | 5/2008 | Ruckart | ............................ | 707/5 |
| 2008/0181377 A1* | 7/2008 | Qiu et al. | ................... | 379/93.24 |
| 2010/0173677 A1* | 7/2010 | Fu | ................................ | 455/566 |

FOREIGN PATENT DOCUMENTS

| | | |
|---|---|---|
| EP | 1954011 A1 | 8/2008 |
| GB | 2319390 | 5/1998 |
| GB | 2362745 | 11/2001 |

OTHER PUBLICATIONS

Streaming Text Over Video, available at Cocoabuilder.com (last visited Mar. 28, 2008).

Command-line video text overlay tools, available at http://lists.apple.com (last visited Mar. 28, 2008).

What is a text overlay ad for video, available at http://adwords.google.co.uk (last visited Mar. 28, 2008).

What is the difference between text overlay ads for video and AdWords text ads, available at http://adwords.google.co.uk (last visited Mar. 28, 2008).

Streaming Text Orientated Messaging Protocol, Wikipedia (last visited Mar. 28, 2008).

International Search Report Written Opinion—PCT/US2009/055347, International Search Authority—European Patent Office—Nov. 5, 2009.

* cited by examiner

METHOD AND APPARATUS FOR SCROLLING TEXT DISPLAY OF VOICE CALL OR MESSAGE DURING VIDEO DISPLAY SESSION

FIELD OF THE DISCLOSURE

The present disclosure is related to mobile communication devices having a video reception and display capability, voice-to-text processing and displaying video and other information for such devices.

BACKGROUND

Global communication devices today may include a video capability or a multi-media capability that allows the device to display real time video received from a video broadcast system such as Digital Video Broadcasting ("DVB") networks. Various video applications also exist for playing downloaded movies such as MPEG (MP4, etc.) or similar video formats using the display of the mobile communications device. Various other applications of the mobile communications device however, also use the display to display information to the user. For example, voicemail messaging applications usually display an icon, such as a closed envelope, in order to indicate for example a stored voice mail message. The voice mail message may be stored on a remote server such as a voice mail messaging server, or in some cases, may be stored locally in the memory of the mobile communications device.

A user who is operating the mobile communication device to, for example, view real time video transmitted via a DVB network may have the video viewing interrupted by another application of the mobile communications device, for example, voice mail messaging, or an incoming call. Other applications of the mobile communications device, such as a Short Message Service (SMS) application, Instant Messaging (IM) application, etc., may also result in the user receiving a short message service message during viewing of real time video or during viewing of the stored video file. The user in this case in order to respond to the SMS message or to listen to a voice mail message, would need to shut down or temporarily halt the video application in order to take action with the other corresponding application for example, a voice mail application, a short messaging application or some other similar application.

DETAILED DESCRIPTION

A method disclosed herein includes converting audio data to textual data by applying a voice-to-text conversion to the audio data and displaying the textual data as scrolling text displayed on a display along with video. The scrolling text may be displayed in a portion near the display's bottom and scrolling over the video. Alternatively, the scrolling text may be displayed in a separate scrolling text display portion of the display, either above or below the video.

The method may include receiving a voice call indication from a network, and providing the voice call indication to a user interface, and receiving a user input for receiving and displaying the voice call as scrolling text.

Another method includes receiving a communication message indication from a network and providing a communication message indication to a user interface, where the communication message indication corresponds to an incoming communication message; receiving a user input for receiving and displaying the communication message as scrolling text on a display; and displaying the communication message as scrolling text in response to the user input, where the scrolling text is displayed along with other application related data on the display.

The communication message include audio data, such that the method may further include converting the audio data to textual data by applying a voice-to-text conversion to the audio data; and displaying the textual data as said scrolling text.

The communication message may also include a video portion, such that the method further includes stripping the audio portion from the video portion, to obtain the audio data prior to converting the audio data to textual data via voice-to-text conversion; and displaying the video portion in a picture-in-picture portion of the display.

Another method includes converting received messaging data to a video format to create video formatted messaging data, where the video formatted messaging data includes textual data corresponding to at least a portion of the messaging data; and displaying the video formatted messaging data as scrolling text over other application related data on the display. The method may also include stripping audio data from the messaging data; diverting the audio data from an audio logic to a voice-to-text converter logic; and obtaining the textual data from the voice-to-text converter logic.

The embodiments also include a communication device having a scrolling text logic operative to receive audio data; convert the audio data to textual data by applying a voice-to-text conversion; convert the textual data to a video format; and display the textual data as scrolling text over an application related data on the display. The communication device may further include voice-to-text converter logic operatively coupled to the scrolling text logic, and where the scrolling text logic is further operative to detect application related data on the display; and divert the audio data from the audio logic to the voice-to-text converter logic in response to detecting application related data on the display.

An embodiment includes a computer readable media having executable instructions for execution by at least one processor, that when executed cause the at least one processor to display a video on a display; convert audio data to textual data by applying a voice-to-text conversion; and display said textual data as scrolling text displayed on the display along with a video.

Figure 1:
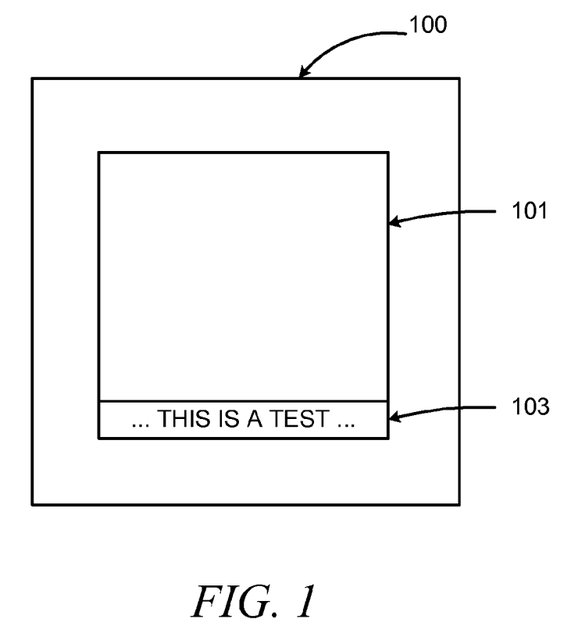
FIG. 1 is a block diagram of a communication device 100 having a display 101 and a scrolling text portion 103 in accordance with an embodiment.
Figure 2:
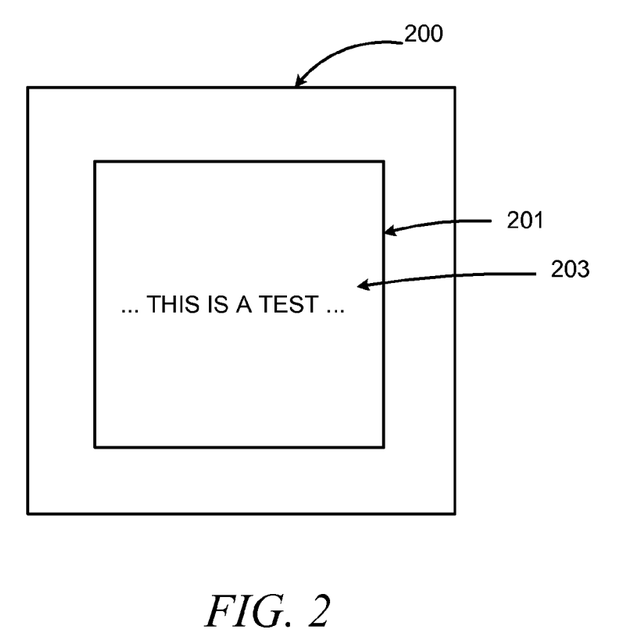
FIG. 2 is a block diagram of a communication device 200 having a display 201 and displaying scrolling text 203 across the display 201 in a somewhat centralized position, in accordance with an embodiment.

Turning now to the drawings wherein like numerals represent like components FIG. 1 illustrates a communications device 100 such as for example, a wireless communication device having a capability to receive video such as, but not limited to, Digital Video Broadcast ("DVB") and may also be capable of receiving various multi-media files such as Multi-Media Messaging Service (MMS) messages. The communications device 100 has a display 101, and, in accordance with the embodiments, the graphic display also includes a text scrolling portion 103, which may be a separate video section or may be a partition of the overall graphic display 101. FIG. 2 illustrates an alternative embodiment to that shown in FIG. 1. In FIG. 2, a communications device 200 includes a display 201 and may display scrolling text 203 at various locations on the display 201 as configured by a user. Video may also include, for example, video stored on the device itself. For example, device 100 may include video (e.g., a video data file) that was transferred to the device through wireless or wired communication with a host/server (e.g., while connected, wirelessly or wiredly, to another computing device of the user.

Figure 3:
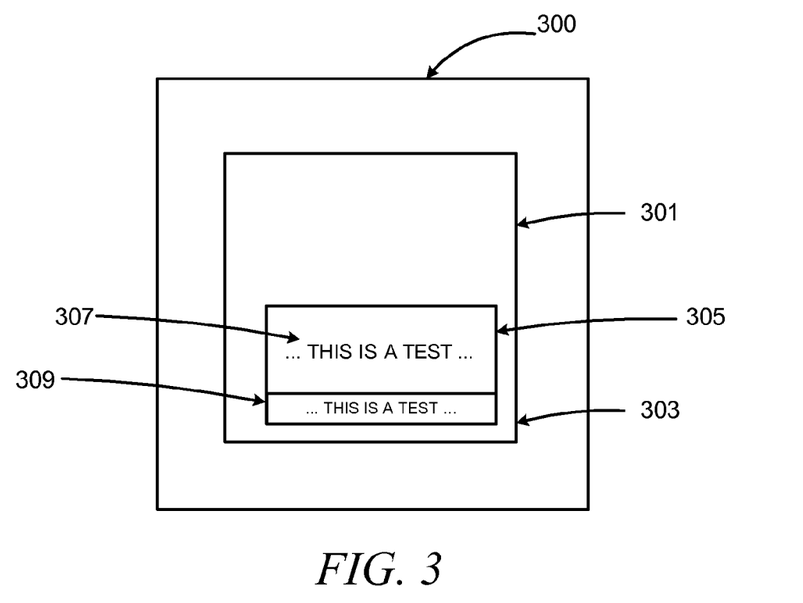
FIG. 3 is a block diagram of a communication device 300 having a display 301 and either displaying scrolling text 307 across a picture-in-picture display 305 in a somewhat centralized position, or, in a scrolling text portion 309 of the picture-in-picture display 305, in accordance with an embodiment.
Figure 4:
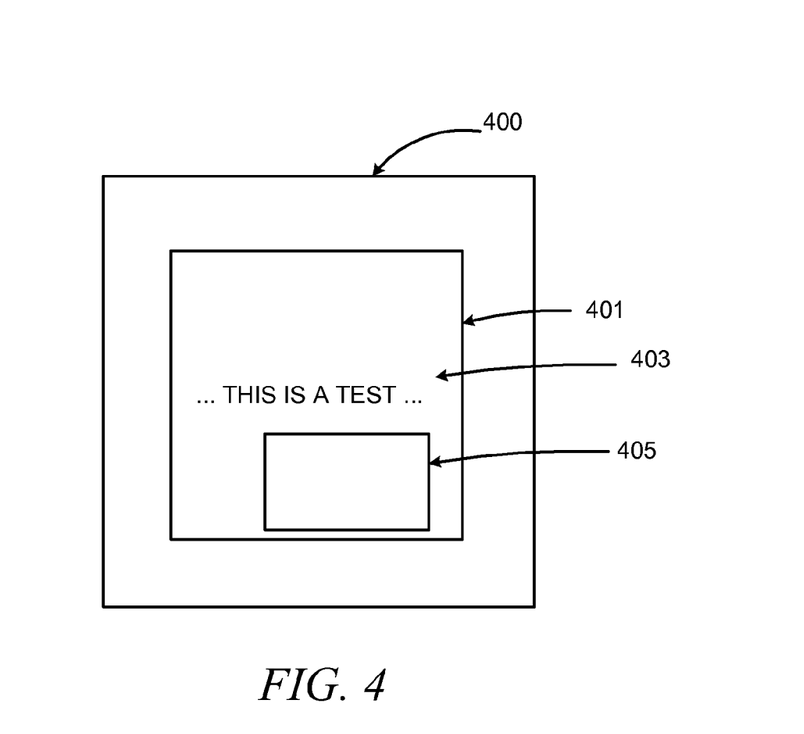
FIG. 4 is a block diagram of a communication device 400 having a display 401 and displaying scrolling text 403 across the display 401 in a somewhat centralized position, where the scrolling text 403 is associated with audio for a picture-in-picture display 405, in accordance with an embodiment.

FIG. 3 illustrates a communication device 300 having a display 301, and, in accordance with the embodiments, displays a picture-in-picture (PiP) portion 305. The PiP portion 305 may, in accordance with the embodiments, include a scrolling text portion 309, or may have scrolling text 307 at various locations on the PiP display 305. FIG. 4 illustrates an alternative embodiment to those illustrated by FIG. 3. In FIG. 4, scrolling text 403 corresponds to a video displayed in PiP portion 405, but rather than being displayed within the PiP portion 405 video, the scrolling text 403 is displayed within the main display 401, similar to the display illustrated by FIG. 2. In other words, the scrolling text 403 may be larger text, and thus more readable, than could be displayed within the PiP portion 405.

Other alternative embodiments may include displaying the scrolling text in a vertical, rather than horizontal orientation, lateral to the main video display, lateral to the PiP portion of the display, or vertically across either of the displays. Likewise, the scrolling text may be oriented at various angles with respect to the display such as diagonally across the main display, or across the PiP portion of the display. Additionally, the voice-to-text converter logic 505 may be appropriate for various languages and may provide voice-to-text conversions where the resulting text is in various languages and using various text characters, such as, but not limited to, English text, Cyrillic, Greek, Chinese, Korean, Arabic, etc.

Figure 5:
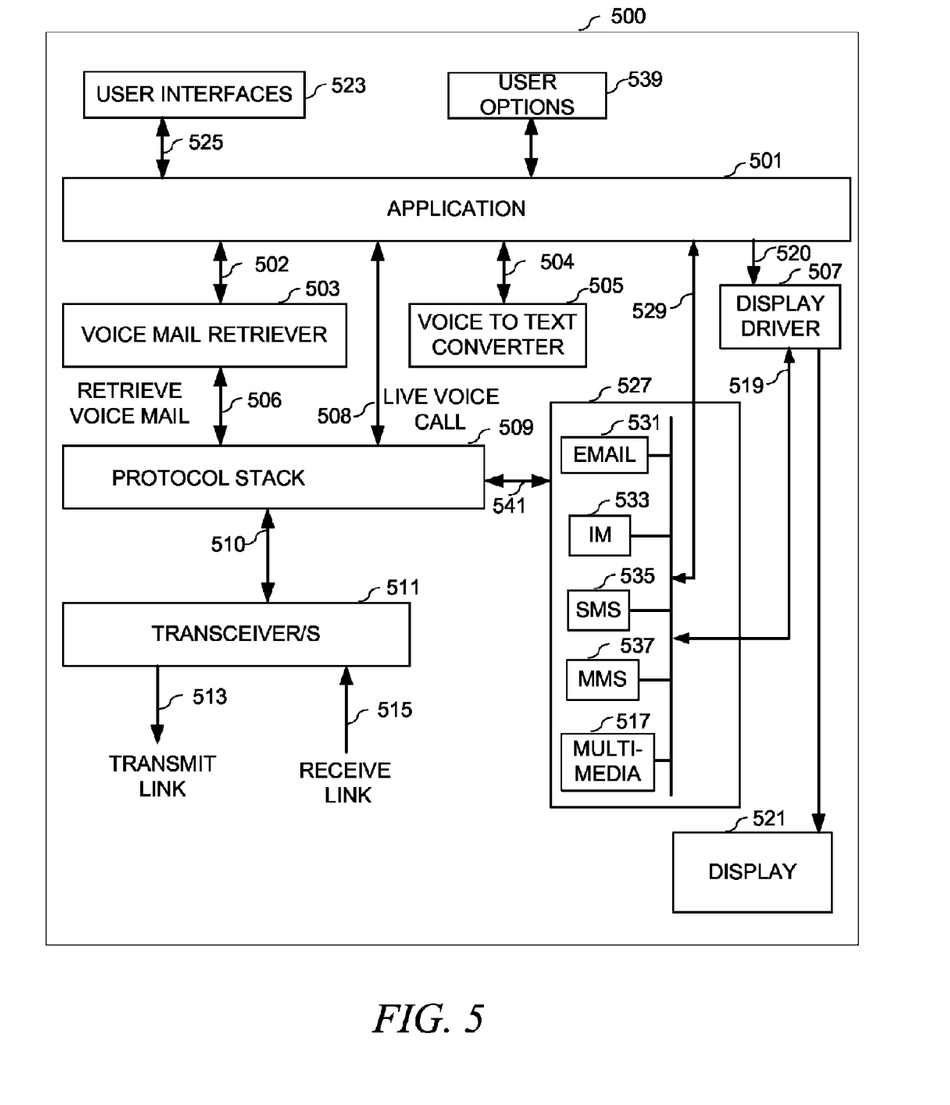
FIG. 5 is a block diagram of a communication device 300 in accordance with an embodiment.

FIG. 5 illustrates a communication device 500 having an application 501 in accordance with the embodiments. The application 501 may be incorporated into a wireless communication device, such as wireless communication device 500. The wireless communication device 500 may be any suitable communication device capable of displaying video, such as but not limited to, a wireless mobile telephone, a laptop computer, a desktop computer, a personal digital assistant, etc., that has the capability to receive a communications message (such as, for example, a voice call, SMS message, Multimedia Messaging Service (MMS) message, instant message or the like), and/or retrieve and display or playback the communications message (e.g., a voicemail, SMS, MMS, IM, or the like, message).

The wireless communication device 500 includes voice mail retriever logic 503, voice-to-text converter logic 505, display driver/s 507, protocol stack 509 and at least one transceiver 511. The term logic as used herein includes software and/or firmware executing on one or more programmable processors, ASICs, hardwired logic, or combinations thereof. The term protocol stack, as used herein, refers to software and/or firmware for execution on one or more programmable processors and/or dedicated processors, or combinations thereof. Thus the application 501 includes a scrolling text logic as will be described herein.

The application 501 is operatively coupled, via communication link 502, to voice mail retriever logic 503 such that the application 501 may send a command to voice mail retriever logic 503, causing it to retrieve a voice mail message file as will be described in further detail herein. Similarly, the application 501 is operatively coupled, via communication link 504, to voice-to-text converter logic 505, such that the application 501 may send voice data to the voice-to-text converter logic 505 for conversion into text data. The application 501 is also operatively coupled to display driver 507 via communication link 520. The various operative couplings such as communication links 502, 504 and 520, may be realized via a data bus within wireless communication device 500, wherein the data bus provides data communications paths among the various logic contained therein. Thus the operative couplings may include other logic as may be needed for purposes of realizing the communication paths. Likewise, a protocol stack 509 is operatively coupled to application 501 via live voice call link 508, such that voice data may be provided to the application 501. The protocol stack 509 is also operatively coupled to voice mail retriever logic 503, via retrieve voice mail link 506, such that voice mail message files may be retrieved from a remote voice mail server as will be describe herein. The application 501 is operatively coupled to the user interfaces 523 of the communication device 500 via communication link 525. The user interfaces 523 may include a keypad, touch sensitive display, mouse, gyroscope or any other device that may receive a user input and provide such user input to the application 501. The user interfaces 523 also includes an audio logic for providing an audio output, and also receiving an audio input, for a voice call.

The protocol stack 509 is coupled to one or more transceivers 511, via communications link 510. The transceiver 511 may transmit data including commands or requests to a network via transmit link 513, and may receive data including commands or requests from a network via receive link 515.

The wireless communication device 500 may also include various clients 527, for receiving and sending messages. For example, the clients 527 may include email client 531, Instant Messaging (IM) client 533, Short Message Service (SMS) client 535, Multi-media Message Service (MMS) client 537, and a Multi-media client 517. The Multi-media client 517 may be, and/or include, various broadcast media clients such as, but not limited to, DVB, MMBS, etc., such that the communication device 500 may receive multi-media broadcasts.

All of the clients, such as multi-media client 517 are operatively coupled to protocol stack 509 and transceiver/s 511, via communications link 541. The clients, such as, but not limited to, multi-media client 517, are also operatively coupled to application 501 via communication link 529, and to display driver 507 via communication link 519. The multi-media client 517, as well as all other clients 527, may interact with other components or logic of the communication device 500 to send and receive messages. The multi-media client 517 may interact with other components or logic to receive a video broadcast, from for example, a video broadcasting system, such as but not limited to, DVB, and may thus, in conjunction with display driver 507, cause the display of video on display 521. The multi-media client 517 may also provide video from various other applications such as, but not limited to, gaming applications, internet browsers, movie players applications, etc. Thus the multi-media client 517 may provide video from various broadcasts, over the air or via the Internet, or from various stored video files.

Figure 6:
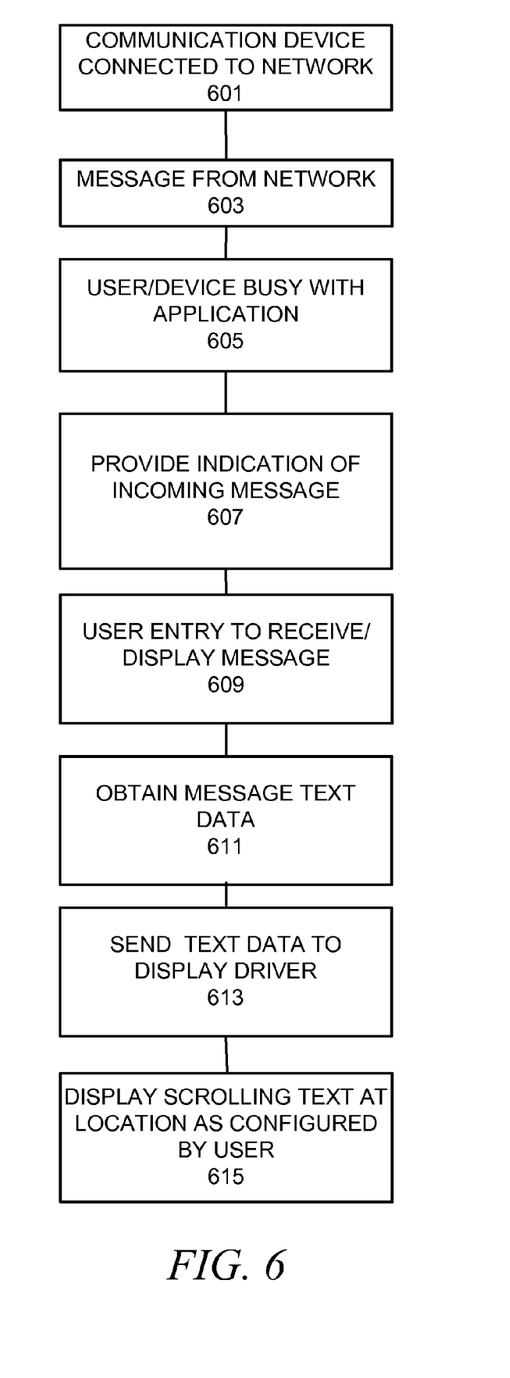
FIG. 6 is a flow chart illustrating operation of a communications device, and handling of various messages, in accordance with the embodiments.

FIG. 6 illustrates operation of the communication device 500 in accordance with an embodiment. In 601, the communication device is connected to a network, over, for example, transmit link 513 and receive link 515 via transceiver/s 511. A voice call may be received from the network over the receive link 515 as shown in 603. However, the user may be busy with an application as shown in 605, for example engaged in a multi-media session, and the multi-media client 517 may be providing video, or other information, to the display 521. As shown in 607, the user will be provided with an indication of an incoming message. The indication may be a visual indicator, or may be an audio tone such as a ring-tone. If the user decides to accept an view the message as in 609, the application 501 will take action to obtain message text data as shown in 611. The message text data may be obtained in various ways as is described in further detail herein. The application 501 will provide the text data to display driver 507 as shown in 613. As shown in 615, scrolling text, which represents the message text data, will then be displayed on display 521 along with information displayed from the other application which the user was engaged with, for example, a video application.

Figure 7:
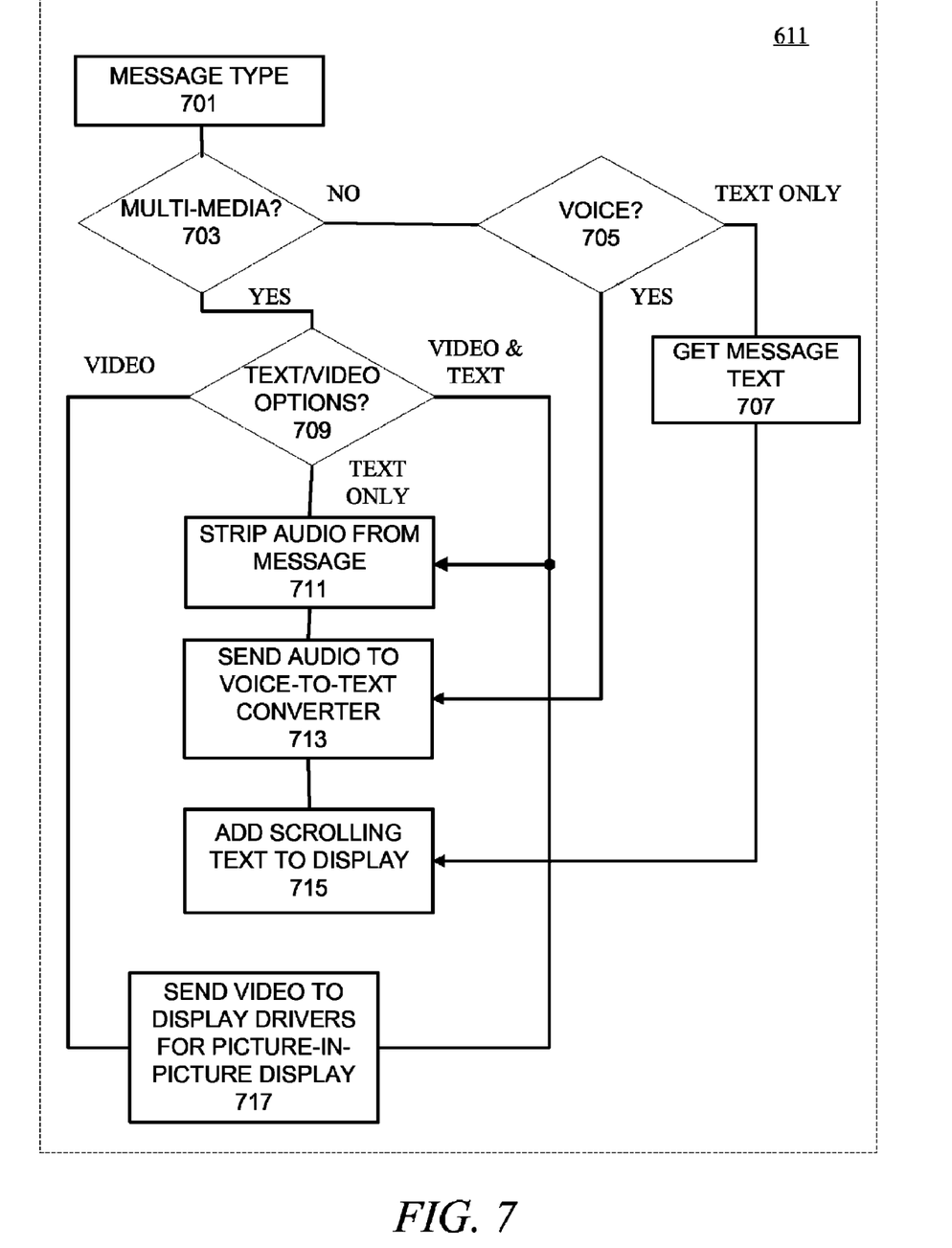
FIG. 7 is a flow chart illustrating further details of block 611, wherein message text data is obtained, prior to displaying the text data as scrolling text in accordance with the embodiments.

FIG. 7 illustrates further details of block 611 and how message text data may be obtained in the various embodiments. In 701 a given message type is received from the process illustrated in FIG. 6. If the message is not a multi-media message in 703, and if the message is not a voice message or voice call in 705, then the message is handled as a text only message, for example, and IM, SMS, or email message. The application 501 will get the message text as shown in 707, from the appropriate client of clients 527. The application 501 will then provide the text data, over communication link 520, to the display drive 507 to display as scrolling text as shown in 717.

If however the message is a multi-media message in 703, for example an MMS message, the application 501 will check text/video options as in 709, by, for example, checking a set of stored user option settings in user options 539. Various user settings may be applied in the embodiments, for example, the user may select to receive video only, such as a PiP display, or may choose to receive video and scrolling text corresponding to the video. The scrolling text position may also be settable via the user options 539, and therefore the scrolling text may be displayed as was illustrated previously by FIG. 1 through FIG. 4.

Therefore in 709, text/video option settings are checked. If a video only option is selected, then the application 501 will send the video to the display drivers for PiP display as in 717. In this case, the user may, if desired, select the PiP display thereby causing the audio portion, if any, to be played along with the video in the PiP display. Otherwise, the video may run silently in the PiP display, while the user receives audio from another currently running application or video.

If however a video and text option setting is detected in 709, then the application 501 may strip the audio portion from the message as in 711. The stripped audio portion may then be provided to the voice-to-text converter 505 as shown in 713, and added to the display as scrolling text as shown in 715. For PiP display of video, or MMS messages, the scrolling text may be displayed in accordance with any of the examples illustrated by FIG. 3 and FIG. 4, and may be located at any desired position on the display in accordance with user settings stored in user options 539. The application 501 therefore provides a user interface such that a user may select options for storage in user options 539. Default values for the user options 539 may be provided in the embodiments, such that, for example, video and text may be a default display setting for MMS messages or video. Various other default settings may likewise be appropriate for the various embodiments.

Figure 8:
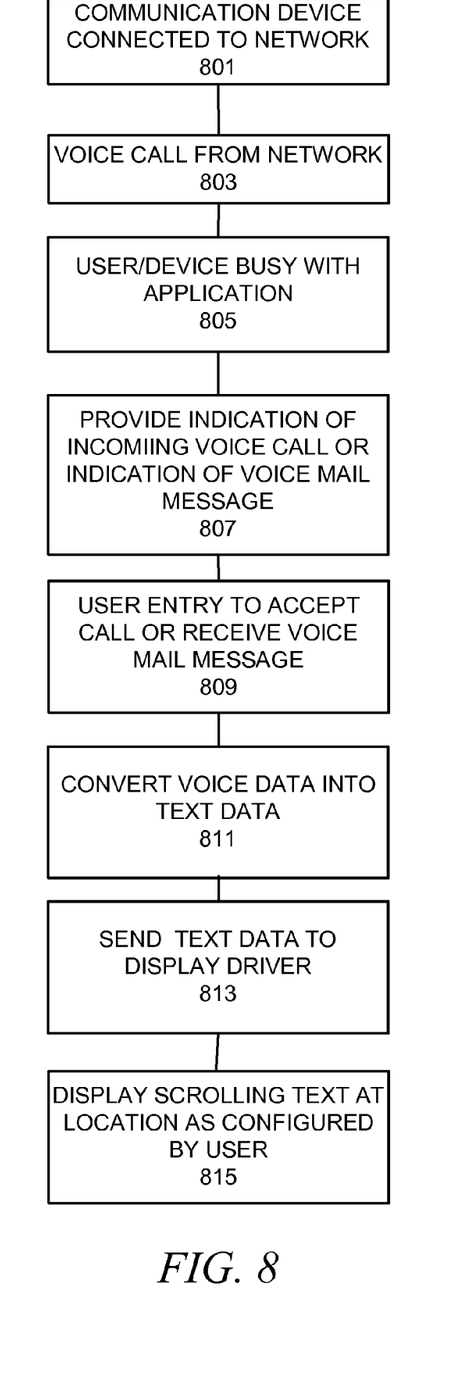
FIG. 8 is a flow chart illustrating operation with respect to voice calls and voice mail messages in accordance with an embodiment.

FIG. 8 illustrates operation of the communication device 500 in accordance with an embodiment. In 801, the communication device is connected to a network, over, for example, transmit link 513 and receive link 515 via transceiver/s 511. A voice call may be received from the network over the receive link 515 as shown in 803. However, the user may be busy with an application as shown in 805, for example engaged in a multi-media session, and the multi-media client 517 may be providing video, or other information, to the display 521. As shown in 807, the user will be provided with an indication of an incoming call. The indication may be a visual indicator, or may be an audio tone such as a ring-tone. If the user decides to accept the call as in 809, the application 501 will establish a live voice call link 508 to protocol stack 509, to receive voice data from the network. The application 501 will however divert the voice data from the audio logic of the communication device 500, and will instead send the voice data to voice-to-text converter logic 505 over communication link 504. The voice-to-text converter logic 505 will therefore convert the audio data to text as shown in 811, and will, via application 501, provide the text data to display driver 507 as shown in 813. As shown in 815, scrolling text, which represents the received voice call, will then be displayed on display 521 along with information displayed from the other application which the user was engaged with, for example, a video application.

In accordance with the embodiments, the application 501 may also retrieve and display as scrolling text, a voice mail message file. Therefore the user may ignore the call in 803 in which case a voice mail indication may be provided in 807. The user may therefore decide to receive the voice mail message in 809, and application 501 may then command the voice mail retriever logic 503 to obtain the voice mail file either from a remote voice mail server or from memory used for storing voice mail directly on communication device 500. The retrieved voice mail file will then be converted to text in 811 and displayed accordingly.

Figure 9:
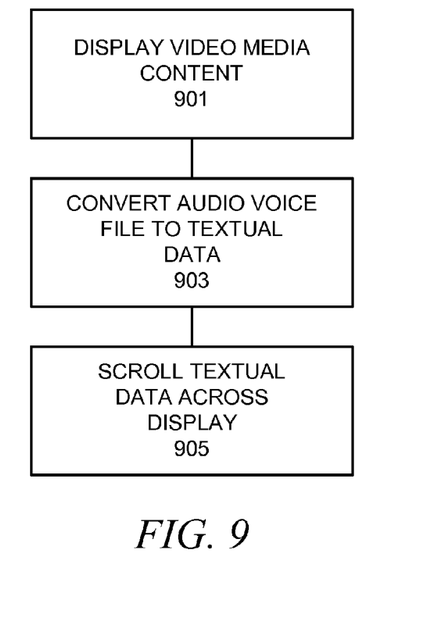
FIG. 9 is a flow chart illustrating operation with respect to video media content, and handling of audio files, in accordance with an embodiment.
Figure 10:
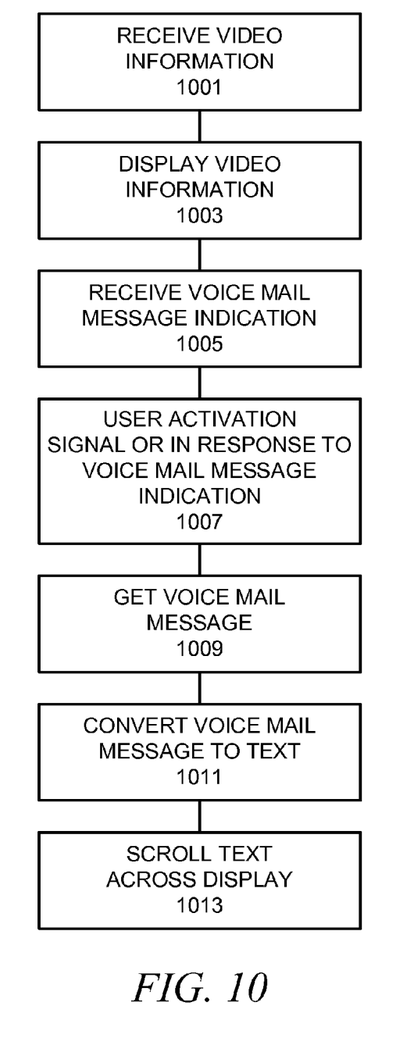
FIG. 10 is a flow chart illustrating further details of operation with respect to handling of voice mail messages in accordance with an embodiment.

This embodiment is further illustrated with respect to FIG. 9. As shown in 901, video media content, or any other information, may be displayed. An audio voice file may be converted to textual data as in 903. The textual data may then be scrolled across the display as in 905, along with the video media content or other information, at the same time. That is, a video application may continue to play video as the text of the voice mail message is scrolled across the display. FIG. 10 illustrates further details of the embodiment. In 1001, video information is received. For example, DVB data may be received from a video digital broadcasting network. In 1003, the video information is displayed on the display 521. In 1005, a voicemail message indication is received, for example, a voicemail message indication from a wireless network. In 1007, the user may provide an activation signal via user interfaces 523. For example, the user may press a key on a keypad such that the application 501 may, in response to the user input, convert the voicemail message to scrolling text on the display 521. Alternatively in 1007, the voicemail message indication may be detected by the application 501, where the application 501, in response may automatically retrieve the voicemail message as shown in 1009. In 1011, the voicemail message is converted to text and, in 1013, the text is scrolled across the display 521 as previously described.

Figure 11:
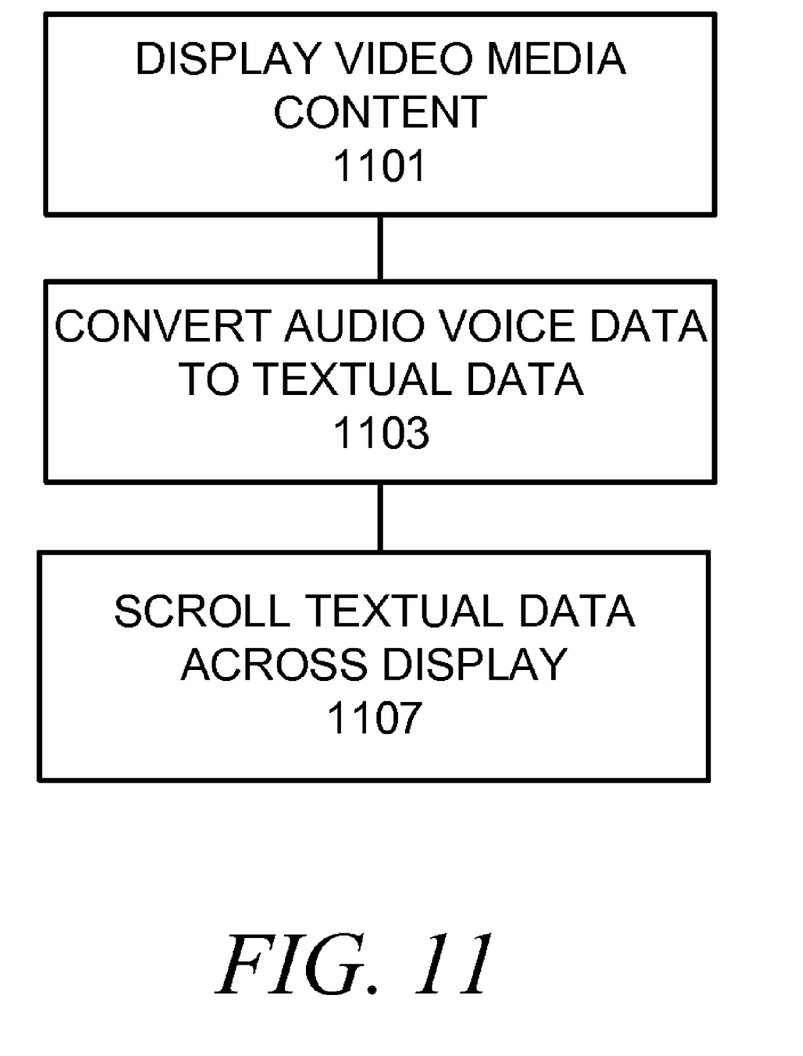
FIG. 11 is a flow chart illustrating operation with respect to video media content, and handling of audio data, in accordance with an embodiment.

FIG. 11 illustrates operation of the application 501 with respect to a voice call. In 1101, video may be displayed on display 521. Audio voice data for a voice call may be received by the communication device 500 and sent to the application over the live voice call link 508. The application manages diversion of the voice data from an audio logic of the communication device 500, and may send the voice data to voice-to-text converter logic 505 as shown in 1103. In 1105, the textual data is scrolled on the display 521 along with the video.

Figure 12:
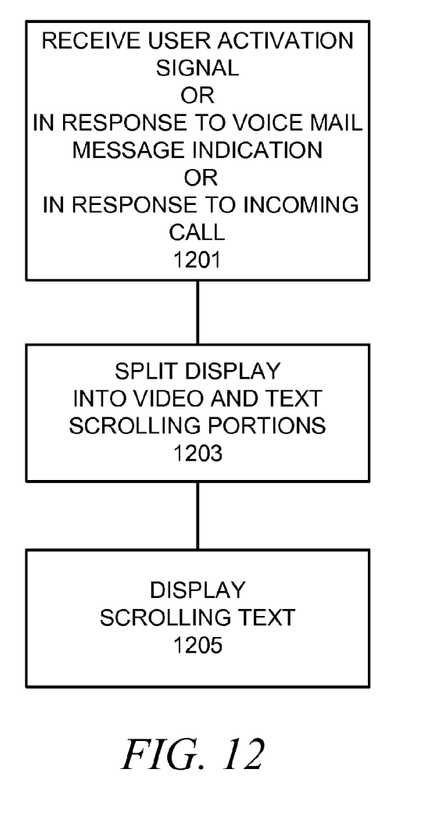
FIG. 12 is a flow chart illustrating operation with respect to handling an incoming voice call or voice mail message indication, and display of scrolling text in scrolling text portion of a display, in accordance with an embodiment.

FIG. 12 illustrates operation of the communication device 500 and application 501 with respect to activation. For example, in 1201, the application 501 may receive a user activation signal from user interfaces 523. The user activation signal may be in response to an incoming voice call, or may be in response to a voice mail indication received from a network. Alternatively, the application 501 may provide configurable user settings stored in user options 539. For example, the user may set an option of user options 539 such that, when a video application is running, any incoming calls are automatically directed to the application 501. In another example, the user may set an option such that, when a voice mail indication is received, the corresponding voice mail message file is automatically retrieved by the application 501. Various other user configurations may be used in accordance with the embodiments.

In 1203, the display 521 may be split into a video portion and a text scrolling portion as was described with respect to FIG. 1 through FIG. 4. As shown in FIG. 2 for example, the text may be scrolled over the video in some embodiments. The application 501 may also provide user configurable settings, stored in user options 539, for configuring the position of the scrolling text with respect to the display 521. For example, the user may set an option such that text is scrolled across the middle of the display 521, or at the top or bottom of the display 521. Other user options may also be provided, such as, but not limited to, color and size of the scrolling text. Therefore, in 1205, the scrolling text is displayed in accordance with the user options 539, or with default settings.

Figure 13:
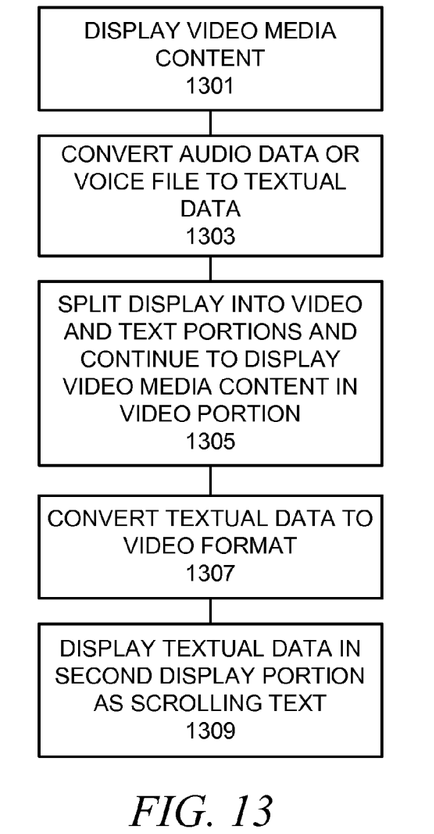
FIG. 13 is a flow chart illustrating operation with respect to conversion of an audio file, or received audio data, to textual data in accordance with an embodiment.

FIG. 13 illustrates an example embodiment corresponding to a display configuration as was shown and described by FIG. 1, and FIG. 3 for PiP displays. In 1301, a video may be displayed and, in 1303, audio data, or an audio file, may be converted to text. In 1305, the application 501, in conjunction with display driver 507, may cause the display to be partitioned into, for example, a video portion 101 and a text portion 103, as illustrated in FIG. 1. The text data is converted to video format by the display driver 507, as shown in 1307, and displayed as scrolling text in the text portion 103, as shown in 1309.

Figure 14:
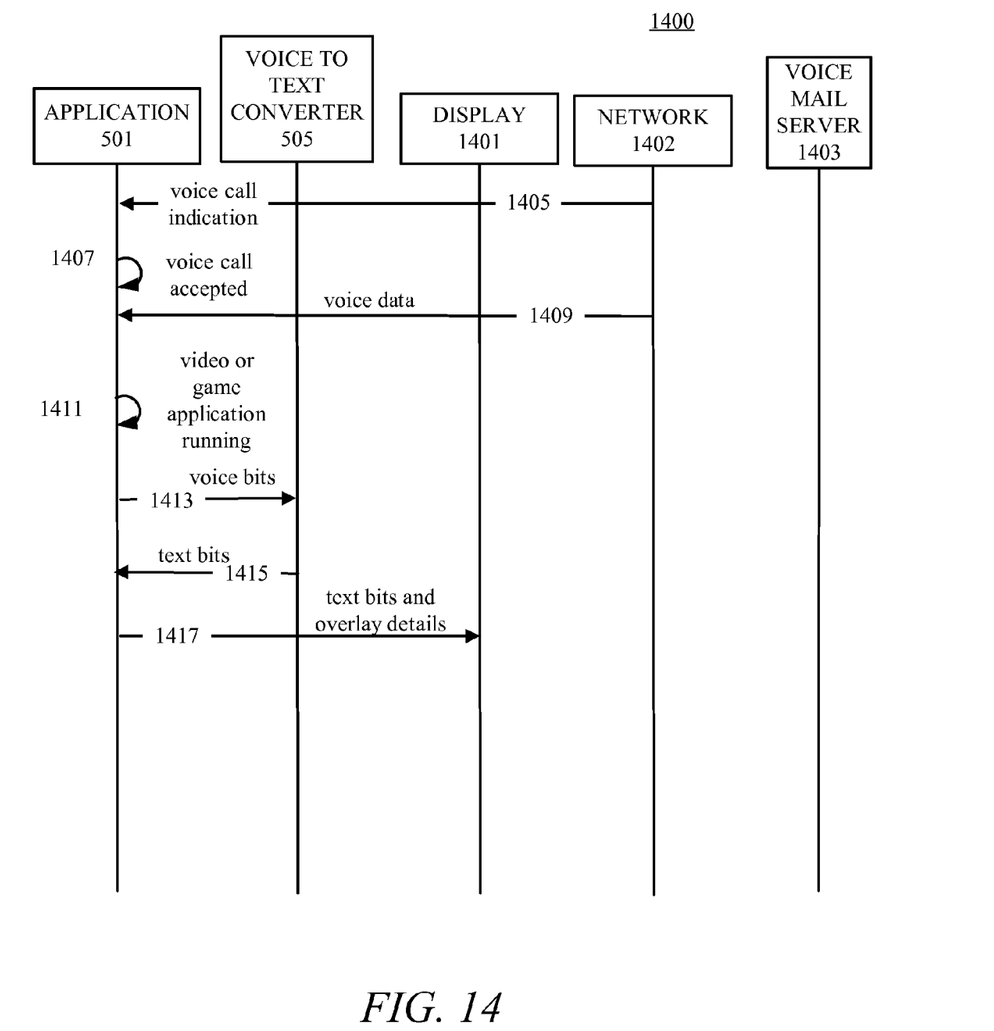
FIG. 14 is a signal flow chart illustrating a communication device handling an incoming voice call in accordance with an embodiment.
Figure 15:
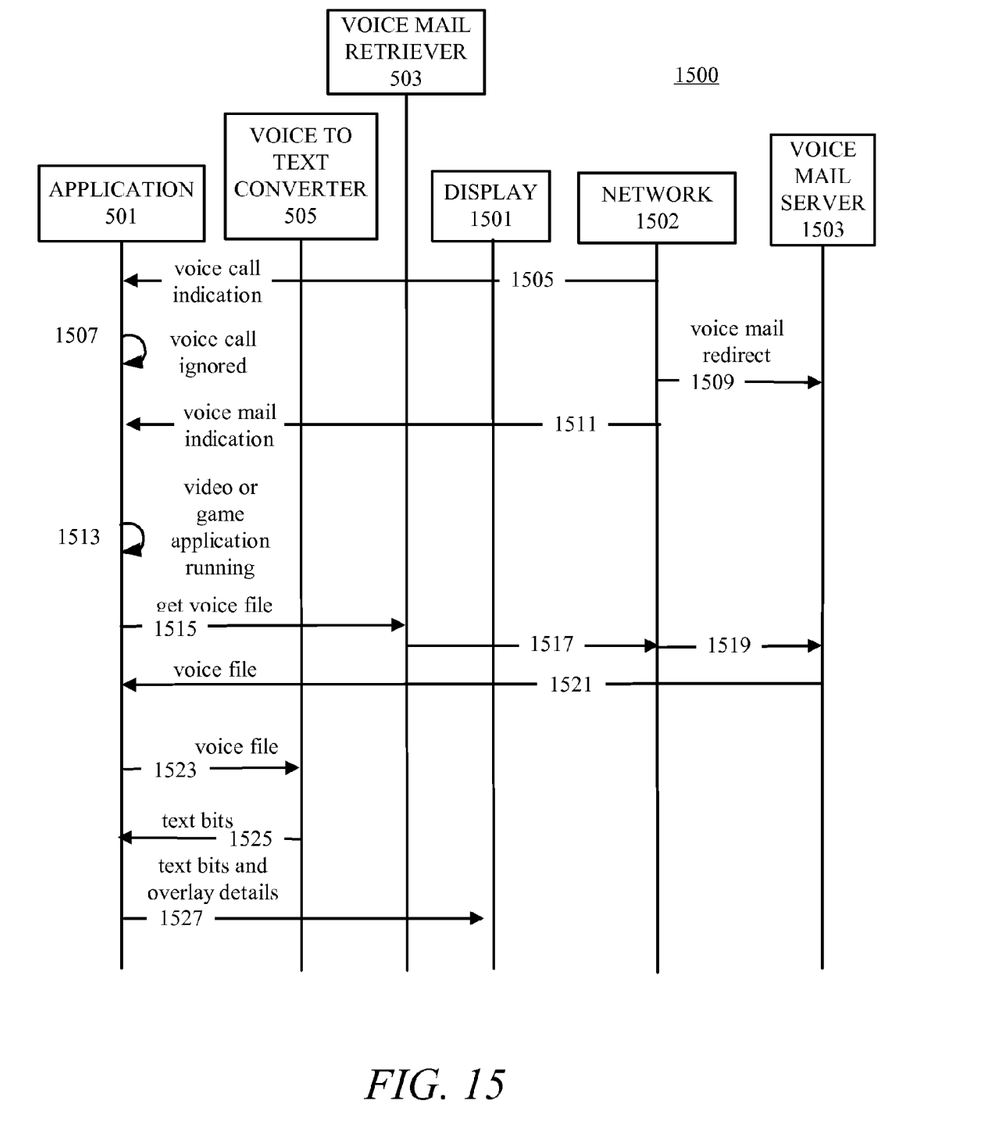
FIG. 15 is a signal flow chart illustrating a communication device handling a voice mail message in accordance with an embodiment.

FIG. 14 and FIG. 15 are signal flow diagrams providing further details of operation of the communication device 500. In FIG. 14, a signal flow diagram 1400 illustrates handling of a voice call by application 501. For example, a network 1402 may send a voice call indication, or paging message, 1405 to the communication device 500. Because of a user setting as discussed above, or because the user is operating an application using the display 521, the application 501 receives the voice call indication 1405. The user may accept the voice call via 1407. This may require a user input via the user interfaces 523, or may be based on a user configuration setting. The application 501 may then receive voice data 1409 from the network 1402. If the user continues to run an application 1411, such as a video or other application such as a gaming application, the application 501 will send voice bits 1413 to voice-to-text converter logic 505. The application 501 will receive the text bits 1415, which correspond to the converted audio, and will send the text bits and overlay details 1417 to the display 1401.

FIG. 15 is a signal flow diagram 1500 illustrating handling of a voice mail message by application 501. Although, in accordance with the embodiments, a voice mail message may be processed by the application 501 at any time, the call process is illustrated for completeness. For example, a voice call indication 1505 may be received by the application 501 similar to the case illustrated by FIG. 14. However, the user may ignore the voice call 1507. In this case the network 1502 will redirect the caller to voice mail via voice mail redirect 1509. If the caller deposits a voice mail message with voice mail server 1503, the network 1502 will send a voice mail message indication 1511 to the application 501. If an application 1513 is running and using the display 1501, the application 501 may get the voice file 1515 via voice mail retriever logic 503. The voice mail retriever logic 503 will communication via messages 1517 and 1519 with the voice mail server 1503 via network 1502, and will obtain the voice file 1521.

The application 501 will provide the voice file 1523 to the voice-to-text converter logic 505, and will receive back text bits 1525, corresponding to the voice file. The application 501 will then provide the text bits and overlay details 1527 to the display 1501.

Therefore, methods and apparatuses for displaying scrolling text, wherein the scrolling text represents a voice mail message, or audio of an MMS message or a video, and wherein the scrolling text is displayed along with video broadcast data, or along with video or application data displayed on a display from a video file simultaneously. Various advantages of the herein disclosed embodiments will be apparent to those of ordinary skill in the art.

What is claimed is:

1. A method comprising:
receiving video information at a wireless mobile communication device, the video information being digital video broadcast (DVB) data received from a video digital broadcasting network;
running, by the wireless mobile communication device, a video application that displays the video information on a display of the wireless mobile communication device;
providing, by the wireless mobile communication device, a user with an indication of an incoming message, the message having a video portion and an audio portion;
obtaining, by the video application, message text data, wherein obtaining the message text data comprises:
stripping an audio portion of the message; and
providing the audio portion to a voice-to-text converter at the wireless mobile communication device, the voice-to-text converter converting the audio portion of the message to the message text data by applying a voice-to-text conversion to the audio portion; and
continuing to play the video information in the display while the video portion of the communication message is displayed in a picture-in-picture (PiP) portion of the display and while the message text data is scrolled across a portion of the display outside the PiP portion of the display.

2. The method of claim 1, further comprising:
receiving a user input for receiving the message; and
obtaining the message text data in response to receiving the user input.

3. The method of claim 2, further comprising:
detecting that the video information is being displayed on the display; and
diverting the audio portion from an audio logic to the voice-to-text converter, for conversion of said audio portion to said message text data.

4. The method of claim 1, further comprising:
retrieving said audio from one of a remote storage or from a memory.

5. The method of claim 1, wherein providing the user with the indication of the incoming message comprises:
producing an audio indication or displaying an icon on said display.

6. A method comprising:
receiving video information at a wireless mobile communication device, the video information being digital video broadcast (DVB) data received from a video digital broadcasting network;
running, by the wireless mobile communication device, a video application that displays the video information on a display of the wireless mobile communication device;
receiving a communication message indication from a network;
providing the communication message indication to a user interface, the communication message indication corresponding to an incoming communication message, the communication message having a video portion and an audio portion;
receiving a user input for receiving the communication message and displaying the audio portion of the communication message as scrolling text on the display;
obtaining, by the video application, message text data, wherein obtaining the message text data comprises:
stripping the audio portion of the communication message; and
providing the audio portion to a voice-to-text converter at the wireless mobile communication device, the voice-to-text converter converting the audio portion of the message to the message text data by applying a voice-to-text conversion to the audio portion; and
in response to the user input, continuing to play the video information on the display while the video portion of the communication message is displayed in a picture-in-picture (PiP) portion of the display and while the message text data is scrolled across a portion of the display outside the PiP portion of the display.

7. A method comprising:
receiving video information at a wireless mobile communication device, the video information being digital video broadcast (DVB) data received from a video digital broadcasting network;
running, by the wireless mobile communication device, a video application that displays the video information on a display of the wireless mobile communication device;
providing by the wireless mobile communication device, a user with an indication of an incoming message, the message having a video portion and an audio portion;
obtaining, by the video application, message text data, wherein obtaining the message text data comprises:
stripping the audio portion of the message; and
providing the audio portion to a voice-to-text converter at the wireless mobile communication device, the voice-to-text converter converting the audio portion to a video format to create video formatted messaging data, the video formatted messaging data including textual data corresponding to the audio portion; and
continuing to play the video information in the display while the video portion of the communication message is displayed in a picture-in-picture (PiP) portion of the display and while the video formatted messaging data is scrolled across a portion of the display outside the PiP portion of the display.

8. The method of claim 7, further comprising:
diverting the audio portion from an audio logic to the voice-to-text converter; and
obtaining the message text data from the voice-to-text converter.

9. A wireless mobile communication device comprising:
a display; and
one or more programmable processors or application-specific integrated circuits (ASICs) that execute scrolling text logic operative to:
receive video information at a wireless mobile communication device, the video information being digital video broadcast (DVB) data received from a video digital broadcasting network;
run a video application that displays the video information on the display;
provide a user with an indication of an incoming message, the message having an audio portion and a video portion;
obtain, by the video application, message text data, wherein obtaining the message text data comprises:
stripping the audio portion of the message; and
providing the audio portion to a voice-to-text converter, the voice-to-text converter converting the audio portion of the message to the message text data by applying a voice-to-text conversion to the audio portion;
convert said textual the message text data to a video format; and
continue to play the video information on the display while the video portion of the incoming message is displayed in a picture-in-picture (PiP) portion of the display and while the message text is scrolled across a portion of the display outside the PiP portion of the display.

10. The communication device of claim 9,
wherein the one or more programmable processors or ASICs are further operative to:
  detect the video information on the display; and
  divert the audio portion from an audio logic to the voice-to-text converter in response to detecting the video information on the display.

11. The communication device of claim 10, wherein the one or more programmable processors or ASICs are further operative to:
  receive a user input for receiving the message; and
  obtaining the message text data in response to receiving the user input.

12. A non-transitory computer readable media comprising:
  executable instructions for execution by at least one processor of a wireless mobile communication device, that when executed cause the at least one processor to:
    receive video information at the wireless mobile communication device, the video information being digital video broadcast (DVB) data received from a video digital broadcasting network;
    run a video application that displays the video information on a display of the wireless mobile communication device;
    provide a user with an indication of an incoming message, the message having an audio portion and a video portion;
    obtain, by the video application, message text data, wherein obtaining the message text data comprises:
      stripping the audio portion of the message; and
      providing the audio portion to a voice-to-text converter, the voice-to-text converter converting the portion to the message text data by applying a voice-to-text conversion to the audio portion; and
    continue to play the video information on the display while the video portion of the communication message is displayed in a picture-in-picture (PiP) portion of the display and while the message text data is scrolled across a portion of the display outside the PiP portion of the display.

\* \* \* \* \*